United States Patent
Kuehnl et al.

(10) Patent No.: US 8,316,168 B2
(45) Date of Patent: Nov. 20, 2012

(54) METHOD AND COMMUNICATIONS SYSTEM FOR THE CONFIGURATION OF A COMMUNICATIONS MODULE CONTAINING A LOGIC COMPONENT

(75) Inventors: Claus Peter Kuehnl, Loehne (DE); Klas Hellmann, Hameln (DE); Johannes Kalhoff, Blomberg (DE); Holger Meyer, Aerzen (DE); Dietmar Krumsiek, Emmerthal (DE)

(73) Assignee: Phoenix Contact GmbH & Co. KG (DE)

( * ) Notice: Subject to any disclaimer, the term of this patent is extended or adjusted under 35 U.S.C. 154(b) by 510 days.

(21) Appl. No.: 12/688,002

(22) Filed: Jan. 15, 2010

(65) Prior Publication Data

US 2010/0185798 A1     Jul. 22, 2010

(30) Foreign Application Priority Data

Jan. 19, 2009    (DE) .......................... 10 2009 005 399

(51) Int. Cl.
     *G06F 13/00*      (2006.01)
(52) U.S. Cl. .............. 710/104; 326/38; 326/41; 326/47; 710/11; 710/61; 710/105
(58) Field of Classification Search .............. 326/37–41, 326/47; 710/11, 58, 61, 104–105
See application file for complete search history.

(56) References Cited

U.S. PATENT DOCUMENTS

| | | | |
|---|---|---|---|
| 5,535,342 A | | 7/1996 | Taylor |
| 6,081,473 A | * | 6/2000 | Agrawal et al. .......... 365/230.01 |
| 6,625,637 B1 | * | 9/2003 | Cuesta et al. ................ 718/102 |
| 6,744,274 B1 | * | 6/2004 | Arnold et al. ................... 326/16 |
| 7,130,942 B2 | * | 10/2006 | Gemelli et al. ............... 710/105 |
| 7,592,833 B1 | * | 9/2009 | Weiss .............................. 326/38 |
| 7,613,858 B1 | * | 11/2009 | Jackson et al. ................ 710/104 |

FOREIGN PATENT DOCUMENTS

| | | |
|---|---|---|
| DE | 42 05 524 A1 | 8/1992 |
| DE | 102 21 772 A1 | 11/2003 |

OTHER PUBLICATIONS

European Patent Office, "European Search Report for International Application No. 10000398.7-2206", Jul. 5, 2010, Publisher: European Patent Office, Published in: EP.
G. Lias et al., "Implementing a Fieldbus Interface Using an FPGA", , pp. 175-180, Publisher: Internet: URL: http//:www.springerlink.com/content/j8flec52908xcbgb, Published in: Vigo, Spain, 2000.
German Patent Office, German Office Action dated Aug. 5, 2009, Application No. 10 2009 005 3999-31.

* cited by examiner

*Primary Examiner* — Jason M Crawford
(74) *Attorney, Agent, or Firm* — Kaplan Breyer Schwarz & Ottesen, LLP

(57) ABSTRACT

The invention relates to a method according to which a cycle-oriented control program generated for a programmable logic controller (110) is at least partially converted into a code that may be executed by a logic component (80) of a communications module (10), such that at least the converted program segment of the cycle-oriented control program may be executed in a cycle-free manner. Cycle-free or virtually cycle-free means that at least some of the implemented control functions and system functions may be executed in a parallel fashion and therefore more quickly than would be the case if the cycle-oriented control program were executed by the PLC (110).

14 Claims, 3 Drawing Sheets

METHOD AND COMMUNICATIONS SYSTEM FOR THE CONFIGURATION OF A COMMUNICATIONS MODULE CONTAINING A LOGIC COMPONENT

FIELD OF INVENTION

The invention relates to a method for the configuration of a communications module containing a logic component for controlling a communications system, in particular an automation system, in an at least partially cycle-free manner, as well as a communications system for the configuration of such a communications module.

BACKGROUND OF THE INVENTION

In order to control process sequences, automation systems, for example, field bus systems, are used in which, as a rule, a programmable logic controller (PLC) is connected to sensors and actuators by way of a bus in order to observe and control the process. Process control is performed, for example, by a cycle-oriented control program that, as a rule, is permanently stored by the manufacturer in a PLC unit as an operating system. The cyclically operating control program first detects the status of all of the sensors that are connected to the PLC unit and uses the data it acquires to produce a process diagram of all inputs to the PLC unit. Then the cycle-oriented control program cedes control to a user program. The user program now uses the process diagram of all inputs to generate a process diagram of all outputs, i.e., the output signals designated for the attached actuators. Then the user program cedes control of the system back to the operating system, i.e., the cycle-oriented control program. The control program ensures that the output signals are transmitted to the respective actuators. Then the control cycle begins again from the beginning.

SUMMARY OF THE INVENTION

The object of the present invention is to create a method and a communications system for the configuration of a communications module containing a logic component, which allow flexible and rapid process control in a communications system.

A core concept of the invention may be seen in the fact that a cycle-oriented control program produced for a programmable logic controller is at least partially converted into a code that may be executed by a logic component of a communications module, such that at least the converted program segment of the cycle-oriented control program may be embodied in a cycle-free manner. Cycle-free or virtually cycle-free means that at least some of the implemented control functions, application functions, and/or system functions may be executed in a parallel and therefore faster manner than would be the case if the control program were embodied in a cycle-oriented fashion.

A method is disclosed for the configuration of a communications module containing a logic component for controlling a communications system, in particular an automation system, in an at least partially cycle-free manner. First, a cycle-oriented control program is generated that may be executed in a programmable logic controller unit for the cycle-oriented operation of the communications system. A cycle-oriented control program may be generated, for example, by an IEC 61131 programming system. At least one program segment of the cycle-oriented control program is converted into a code that may be executed by a logic component. The logic component may be, for example, an FPGA (field programmable gate array). The code of the converted program segment is loaded into a logic component of a communications module, which will be referred to below as a logic module. The logic component of the communications module, as a response to the code, will then execute the corresponding program segment in a cycle-free manner. In this case, the communications module functions as a control device, which executes at least some of the projected functions at the gate level.

Cycle-free control or cycle-free operation may mean, for example, that the logic component of the communications module detects the status of all of the sensors connected to the communications module in a parallel fashion rather than sequentially, as would be the case when executing the cycle-oriented control program.

The code loaded into the logic component may be an HDL (hardware description language) code or any desired code that is usable for further processing in the logic component.

In order to allow a flexible and efficient control of the communications system, a plurality of communications modules assume the system control function. For this purpose, the cycle-oriented control program is divided into a plurality of program segments. The program segments of the cycle-oriented control program are then each converted into a code that may be executed by a logic component. The codes of the converted program segments are then each loaded into a logic component of a separate communications module. The logic components communicate with one another in such a way that, in response to the respective code, the converted program segments of the cycle-oriented control program may be executed in a cycle-free manner. In this exemplary embodiment, the entire cycle-oriented control program or at least some program segments thereof may be executed in a cycle-free manner by a plurality of communications modules. The distribution of the converted program segments over the logic components of the communications module and the communications between the communications modules and/or logic components may occur via temporary or permanent interconnections. In a dynamically constructed interconnection, the code may be altered or substituted in the logic component even during ongoing operation, i.e., "online." The interconnections may also be embodied as serial connections, for example, by means of shift registers.

In order to be able to ensure an orderly operation in the case of a distributed control of the communications system, the logic components must be synchronized for the correct execution of the respective codes.

If the cycle-oriented control program is not completely converted into one or more codes, then the program segment of the cycle-oriented control program that was not converted is executed by a programmable logic controller. The converted program segments are loaded as code into one or more logic components. The programmable logic controller and the logic components in which the converted program segments are stored as code cooperated in such a way that one program segment of the cycle-oriented control program that has been converted is executed only by the respective logic component and not by the programmable logic controller. The correct program execution may be monitored and controlled by the programmable logic controller or at least by the corresponding logic component.

In order to be able to change the operating control system during ongoing operation, the code stored in each logic component is divided into segments. Depending on the implementation, these segments may be divided into alterable and non-alterable segments. If a predetermined segment is replaced, the new segment is loaded at a free location on the logic component or the segment to be replaced is written over. The remaining segments of the code, which are not to be replaced, continue to be executable.

As mentioned, if the new segment is stored separately in the logic component, the logic component may, in response to a release signal, deactivate the segment to be replaced and integrate and activate the new segment in the code.

It should be noted that, after loading the new segment, the segment to be replaced may continue to be executed. This measure is particularly advantageous if an error occurs in the testing of the new segment.

A clock provided by the logic component ensures that a process diagram is produced at a certain time and that the segments of the loaded code are executed in a synchronous fashion.

It should be mentioned that the measures described above are all projected functions for controlling the communications system at the gate level and are not conducted via an operating system, as is the case in conventional programmable logic controllers.

In order to be able to exchange a defective logic component in a simple fashion, i.e., primarily without a time-consuming reconfiguration of the new logic component, the code stored in the logic component is additionally stored in a separate memory unit. Such a memory unit may be implemented in each communications module. Alternatively or additionally, an external, centrally connected memory unit may be provided that may be connected to all communications modules and is able to store a plurality of codes. The code is automatically loaded from the central memory unit into the newly installed logic component in response to a predetermined event. As a result, when exchanging a defective logic component, either the defective logic component may be removed from the communications module in question or, if an external memory unit has been provided, the entire communications module may be exchanged and replaced with a new module.

The proposed method and communications module may also be used in a field bus system. To this end, the communications module is configured as a bus subscriber such as, for example, a master unit, sensor, or actuator, in that a field bus-related code is loaded into an additional communications module. The logic component of the additional communications module may then perform the functions of a bus subscriber in response to the field bus-related code.

The communications modules and logic components have at least one input/output interface, by way of which data may be exchanged. A programming interface serves to load the corresponding code into the logic component of the corresponding communications module.

According to a particular embodiment, the communications modules are designed in such a way that they may be latched onto a terminal strip, preferably a top hat rail.

Here, it should be noted that the field bus-related code may also be used to configure the logic component of the additional communications module as a connector module for the sensors and/or actuators. If, in this case, the input/output interfaces of the communications module have been programmed in accordance with suitable communications protocols, the sensors and/or actuators connected to the communications module may be addressed with their respective communications protocols.

A communications system is also disclosed, in particular an automation system. The communications system comprises at least one communications module. The at least one communications module contains a logic component in which the code of a program segment of a cycle-oriented control program is stored that is executable in a programmable logic controller for the cycle-oriented operation of the communications system. In response to the code, the logic component executes a corresponding program segment of the cycle-oriented control program in a cycle-free manner.

In order to be able to adapt the control quickly and flexibly to a new environment, the cycle-oriented control program is divided into a plurality of program segments, each of which is converted into a code that is executable by a logic component. The codes of the converted program segments are each stored in a logic component of a separate communications module. These communications modules are designed in such a way that their logic components, in response to the respective code, execute the associated converted program segments of the cycle-oriented control program in a cycle-free manner.

In order to be able to further increase the performance of the communications system, a programmable logic controller is provided in which the cycle-oriented control program is stored. The logic components of the communications modules cooperate with the programmable logic controller in such a way that the programmable logic controller executes only the program segments that have not been converted, and the logic components execute the program segments of the cycle-oriented control program that have been converted into corresponding codes. In this manner, program segments of the cycle-oriented control program, which may be executed quickly, may be distributed as codes over one or more logic components and may be executed in a cycle-free manner. Program segments that can be or must be executed slowly are executed as before by the programmable logic controller in a cycle-oriented fashion.

BRIEF DESCRIPTION OF THE DRAWINGS

The invention shall be described in greater detail in the following with reference to some exemplary embodiments in conjunction with the attached drawings, which show.

DETAILED DESCRIPTION

Figure 1:
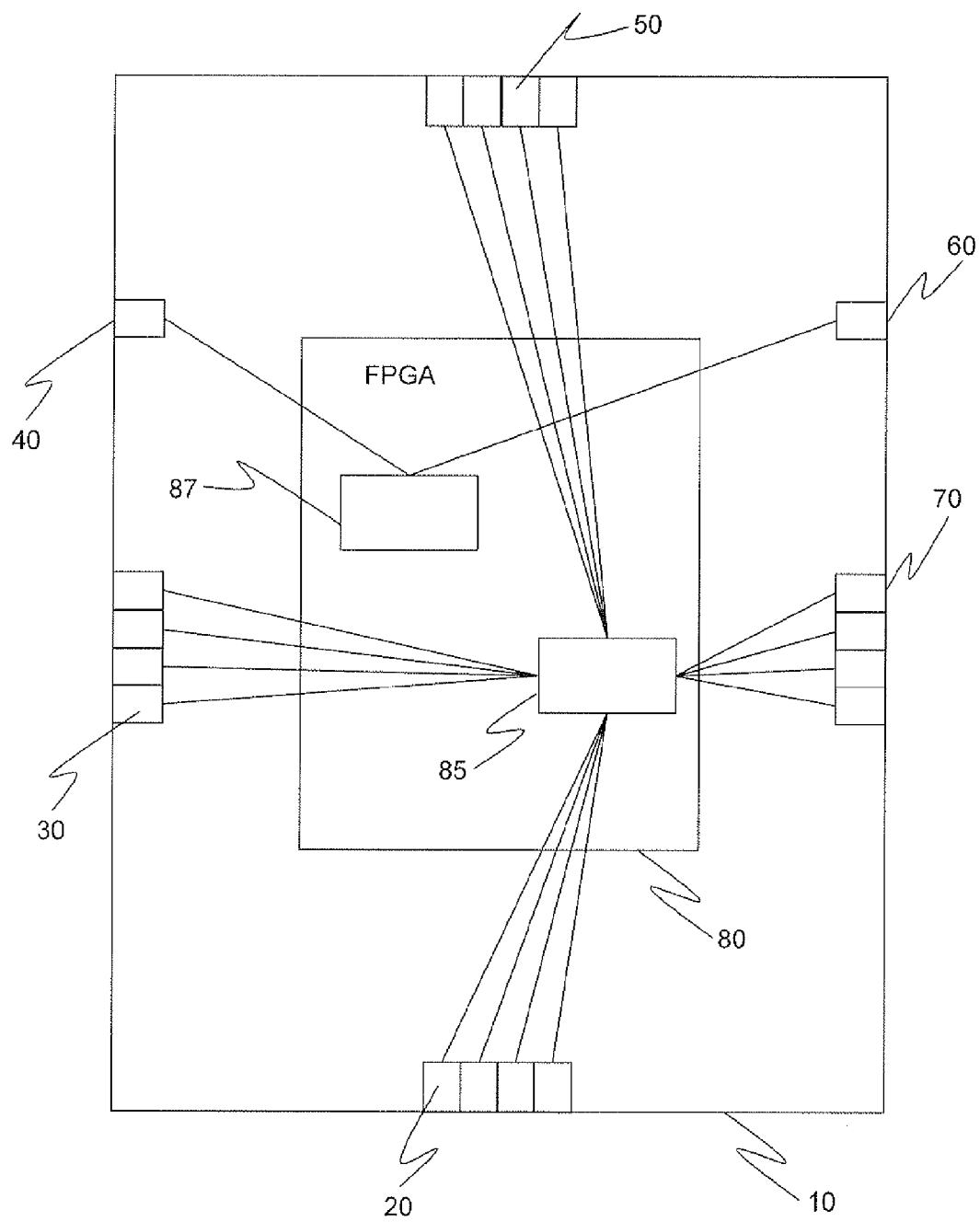
FIG. 1 a communications module having a logic component according to the invention, FIG. 2 a section of a communications system shown schematically having two communications modules according to the invention located next to one another, FIG. 3 an alternative communications system having a PLC and a communications module according to FIG. 1.
Figure 2:
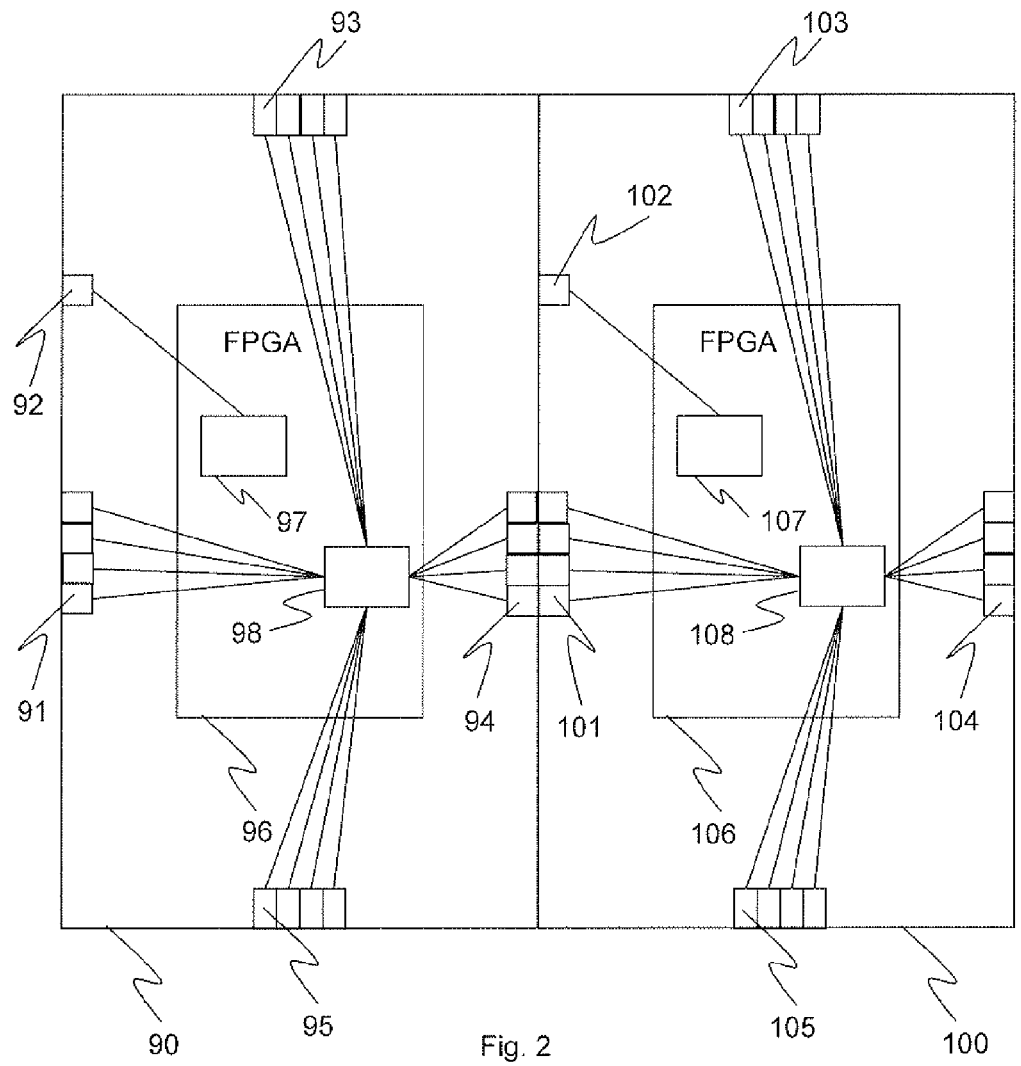
Figure 3:
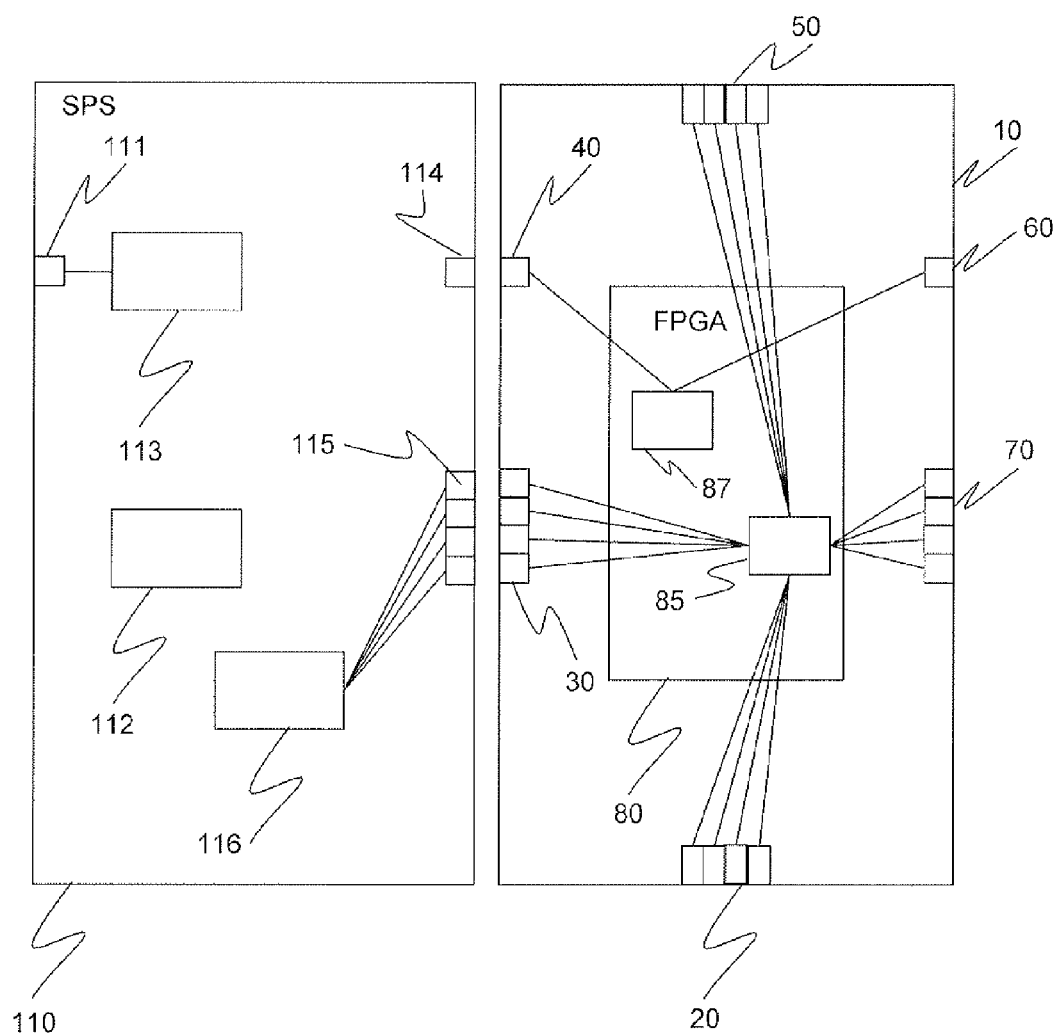

FIG. 1 shows a communications module 10 by way of example, which comprises an FPGA 80 as a logic component. The FPGA 80 is symbolically shown by a loading memory 87 and its programmable gate level 85. The communications module 10 comprises a plurality of interfaces 20, 30, 50, and 70, which may be programmed as outputs and/or inputs. The communications module 10 can communicate via these interfaces with other devices, for example, other communications modules, sensors, or actuators, as is shown, for example, in FIGS. 2 and 3. The FPGA 80 may be programmed, i.e., configured, via an input/output port 40 by means of a programming unit in that, for example, a code of a converted cycle-oriented control program is loaded into the loading memory 87. An additional input/output port 60 may be used for the purpose of loading the code of the converted cycle-oriented control program into the logic component of another communications module, or to transmit a central clock that synchronizes the communicating communications modules and/or their FPGAs. This is necessary, for example, when a plurality of FPGAs 96 and 106 assume the control of a communications system alone, as is shown in FIG. 2 or when at least one FPGA 80 assumes control of a communications system in conjunction with a programmable logic controller 110, also referred to with the acronym PLC, as is shown in FIG. 3.

As a rule, the communications module 10 is a component of an automation system that comprises a plurality of communications modules. FIG. 3 shows by way of example a section of a communications system comprising the PLC 110 and the communications module 10. The PLC 110 as well as the communications module 10 may be latched onto a top hat rail, which is not shown.

According to a first exemplary embodiment, the operation of the communications system should be controlled by means of the PLC and the FPGA 80 of the communications module 10. Naturally, it is also conceivable for additional communications modules to be integrated for controlling the communications system.

We will now assume that a cycle-oriented control program created for a programmable logic controller 110 is to be used in order to achieve an at least partially cycle-free, preferably parallel, control of the communications system. The control program operating in a cycle-oriented fashion may be stored in a memory 112 of the PLC 110 and controls a microprocessor 116. For this purpose, the cycle-oriented control program, produced, for example, by means of an IEC 61131 programming system, is at least partially converted into an HDL code. The HDL code may subsequently be loaded into the memory 87 of the FPGA 80 via the input/output port 40. If the HDL code is provided by the PLC 110, the code may be transmitted via the port 114 and the input/output port 40 to the communications module 10. Here, it should be mentioned that the HDL code may be stored additionally in a central system memory (not shown) or in a memory of the communications module 10 disposed separately from the FPGA. Thus, if necessary, the logic component 80 may be simply be replaced by a functional logic component because the corresponding HDL code can be automatically loaded from the system memory or the memory implemented in the communications module into the new logic component. It should be noted that the loading memory of the respective FPGAs may be activated not only during power-up, but also during operation.

The program segment of the cycle-oriented control program stored as an HDL code programs the gate level 85 of the FPGA 80 in such a way that the functions defined by this program segment may be executed in a cycle-free manner. We will assume that actuators are connected to the interfaces 20 programmed as output interfaces and sensors are connected to the interfaces 50 programmed as input interfaces. In this case, the FPGA 80 may be programmed in such a way that, in response to the HDL code stored in the memory 87, all statuses of the sensors are queried in a parallel fashion via the input interfaces 70; in an additional step, all output parameters for the actuators connected to the interfaces 20 are calculated, and then the output parameters are transmitted in a parallel fashion to the corresponding actuators. In this example, the FPGA 80 is programmed as a connected component group of sensors and/or actuators as they may be used in field bus systems.

Alternately, it would be conceivable for the HDL code stored in the FPGA 80 to perform the application functions of a sensor or an actuator.

The embodiment described here allows functions of the cycle-oriented control program that can be performed quickly, preferably in a parallel fashion, to be performed only by the FPGA 80 of the communications module 10 and for the remaining functions to be performed exclusively by the PLC 110. The PLC 110 and the FPGA 80 of the communications module 10 are able to exchange corresponding, including clock signals, data via an interface 115 of the PLC 110 and the interface 30 of the communications module 10 in order to be able to conduct an orderly process control.

The programmable logic controller 110 may furthermore be connected via an input/output port 111 to an Ethernet-capable bus (not shown). The corresponding communications protocol may be stored in a memory unit 113. The PLC 110 may be connected in this manner to a superordinate communications system.

In the alternative exemplary embodiment described in the following, the operation of the communications system is to be controlled exclusively by at least one FPGA. Naturally, the integration of additional communications modules for controlling the communications system is conceivable as well.

FIG. 2 shows by way of example two communications modules 90 and 100 that are connected to one another and that are intended to execute different program segments of the cycle-oriented control program in a cycle-free manner. The communications modules 90 and 100 may be structured similarly to the communications module 10. As is shown in FIG. 2, the communications module 90 contains an FPGA 96 comprising a loading memory 97 and a configurable gate level 98 that is shown schematically. The communications module 100 also contains an FPGA 106 comprising a loading memory 107 and a configurable gate level 108 that is shown schematically.

We will now assume that the cycle-oriented control program comprises two program segments. An HDL code is generated from each program segment. The one HDL code may be loaded via a port 92 of the communications module 90 into the memory 97 and the other HDL code may be loaded via a port 102 of the communications module 100 into the memory 107. The primary purpose of the separate ports 92 and 102 is to load data, information, and HDL codes into the individual loading memories independently of one another and in a targeted fashion. However, the ports or connections 92 and 102 may also be connected by way of a bus. It is also conceivable for the HDL code intended for the FPGA 106 to be loaded into the loading memory 107 via a transverse connection (not shown) generated, for example, temporarily between the port 92 and the port 102. Data of any kind, including clock signals, may be transmitted between the communications modules 90 and 100 and/or their FPGAs 96 and 106 via input/output interfaces 94 and 101. The clock signal may be used for the synchronous execution of the HDL codes by both FPGAs 96 and 106.

Furthermore, we will assume that sensors are connected to the interfaces 95 of the communications module 90 and actuators are connected to the interface 105 of the communications module 100. Corresponding to the projected functions, the FPGA 96 queries in response to the stored HDL code the status of all sensor connected to the interface 95 and transmits these statuses via the interfaces 94 and 101 to the FPGA 106 of the communications module 100. The FPGA 106 subsequently determines the output parameters for the actuators in response to the stored HDL code and transmits these parameters to all connected actuators.

Because the operation control of a communications system is at least partially distributed over one FPGA or a plurality of cooperating FPGAs, at least some of the projected functions may be executed more quickly than if the operation control were executed by a PLC alone.

The interfaces 94 and 101 of the communications modules 90 and 100 shown in FIG. 2 may, for example, be programmed by means of the respective FPGAs 96 and 106 such that a data exchange is possible between the FPGAs 96 and 106. In this manner, it is possible to change the HDL codes stored in the FPGAs during operation as well.

According to an advantageous refinement of the invention, the HDL code stored in the FPGA 80 may be divided into a plurality of subcodes, also called segments, which may be executed and changed independently of one another. If a predetermined subcode of the HDL code stored in the memory 87 is to be replaced, the new subcode is first generated from the updated cycle-oriented control program and, for example, loaded via the port 40 into the FPGA 80. The subcode to be replaced, which is stored in the memory 87, may be overwritten immediately. Alternately, the new subcode may be stored in a free memory space inside the memory 87 or in a local memory of the communications module 10. In the latter alternative, the FPGA 80 is programmed in such a way that, in response to a predetermined event, it deactivates the subcode to be replaced and activates the new subcode. In this manner, new projected functions may be loaded onto the FPGA during ongoing operation.

What is claimed is:

1. A method for the configuration of a communications module containing a logic component for controlling a communications system in an at least partially cycle-free manner, having the following method steps:
   generating a cycle-oriented control program that is able to be run in a programmable logic controller for the cycle-oriented operation of the communications system;
   converting at least one program segment of the cycle-oriented control program into a code that is executable by a logic component (80, 96, 106); and
   loading the code into the logic component (80, 96, 106) of a communications module (10, 90, 100), with the logic component (80, 96, 106) of the communications module (10, 90, 100) executing the corresponding program segment of the cycle-oriented control program in a cycle-free manner in response to the code.

2. The method according to claim 1, characterized in that the cycle-oriented control program is divided into a plurality of program segments, in that a plurality of program segments of the cycle-oriented control program are each converted into a code that is executable in a logic component (96, 106);in that the codes of the converted program segment are each loaded into the logic component (96, 106) of a separate communications module (90, 100), and in that the logic components (96, 106) of these communications modules (90, 100) communicate with one another for the purpose of executing the converted program segments of the cycle-oriented control program in a cycle-free fashion in response to the respective code.

3. The method according to claim 2, characterized in that the logic components of the communications modules are operated in a synchronous fashion.

4. The method according to claim 1, characterized in that the logic component(s) (80) cooperate with a programmable logic controller (110), in which the cycle-oriented control program runs, in such a way that the converted program segments of the cycle-oriented control program are executed only by the respective logic components (80).

5. The method according to claim 1, characterized in that the code loaded into the respective logic component (80) is divided into segments and in that a predetermined segment of the code stored in the respective logic component is replaced with a new segment.

6. The method according to claim 5 characterized in that the logic component (80, 96, 106) of the respective communications module (10, 90, 100), in response to a release signal, deactivates the predetermined segment and activates the new segment.

7. The method according to claim 1, characterized in that the code is an HDL (hardware description language) code.

8. The method according to claim 1, characterized in that the code is stored in a memory unit and, in response to a predetermined event, is loaded into the respective logic component (80, 96, 106).

9. The method according to claim 1, characterized in that an additional field bus-related code is loaded into a logic component of an additional communications module and in that the logic component of the additional communications module performs the functions of a bus subscriber in response to the field bus-related code.

10. The method according to claim 1, characterized in that some of the communications modules (10, 90, 100) comprise at least one input/output interface that is programmed in accordance with a predetermined communications protocol in order to be able to communicate with a bus subscriber via the predetermined communications protocol.

11. The method according to claim 1, characterized in that the communications modules are latched onto a terminal strip and each comprise one input/output interface (94, 101) for exchanging data and one interface for programming the respective logic component.

12. A communications system having at least one communications module (10) comprising a logic component (80) in which at least the code of a program segment of a cycle-oriented control program is stored, said program being capable of being run in a programmable logic controller (110) for the cycle-oriented operation of the communications system, with the logic component (80) executing the corresponding program segment of the cycle-oriented control program in a cycle-free manner in response to the code.

13. The communications system according to claim 12, characterized in that the cycle-oriented control program is divided into a plurality of program segments, each of which has been converted into a code that is executable by a logic component, in that the codes of the converted program segment are each stored in a logic component (96, 106) of a separate communications module (90, 100), and in that the communications modules are designed in such a way that their logic components execute the converted program segments of the cycle-oriented control program in a cycle-free manner in response to the respective code.

14. The communications system according to claim 12, characterized by a programmable logic controller (110) in which the cycle-oriented control program runs, with at least the one logic component (80) of the communications module (10) cooperating with the programmable logic controller (110) in such a way that the program segment of the cycle-oriented control program converted into the corresponding code is executed only by the at least one logic component (80).

* * * * *